(12) United States Patent
Greer et al.

(10) Patent No.: US 6,814,396 B2
(45) Date of Patent: Nov. 9, 2004

(54) COMPARTMENTALIZED DUMP BODY FOR A DUMP TRUCK

(76) Inventors: Thomas Greer, 62 Polland Rd., Plaistow, NH (US) 03865; Philip Chadwick, 9 Seeley St., Sandown, NH (US) 03873

( * ) Notice: Subject to any disclaimer, the term of this patent is extended or adjusted under 35 U.S.C. 154(b) by 0 days.

(21) Appl. No.: 10/243,021

(22) Filed: Sep. 13, 2002

(65) Prior Publication Data

US 2004/0201250 A1 Oct. 14, 2004

(51) Int. Cl.[7] ................................................. B60P 1/34
(52) U.S. Cl. ..................................... 296/183.2; 298/18
(58) Field of Search .......................... 296/183.2, 183.1, 296/184; 298/13, 18, 11

(56) References Cited

U.S. PATENT DOCUMENTS

| | | | |
|---|---|---|---|
| 2,953,408 A | * | 9/1960 | Koenig |
| 4,054,301 A | * | 10/1977 | Bond et al. |
| 4,371,208 A | * | 2/1983 | Striker |
| 4,666,211 A | * | 5/1987 | Smith et al. |
| 4,840,531 A | * | 6/1989 | Dinneen |
| 4,915,570 A | * | 4/1990 | Rath et al. |
| 4,951,999 A | * | 8/1990 | Rudolph et al. |
| 5,058,957 A | * | 10/1991 | Fell |
| 5,078,567 A | * | 1/1992 | Lombardo |
| 5,252,020 A | * | 10/1993 | Kinne et al. |
| 5,829,842 A | * | 11/1998 | Lombardo |

FOREIGN PATENT DOCUMENTS

JP     55 140618    * 11/1980

* cited by examiner

*Primary Examiner*—Joseph D. Pape
(74) *Attorney, Agent, or Firm*—Paul C. Remus; Michelle Saquet Temple; Devine, Millimet & Branch, PA

(57) ABSTRACT

The novel dump body enables a dump truck to carry large, packaged loads and large, loose loads. The dump body includes a containment base having a bottom and a plurality of sides. The dump body further includes a dumping mechanism formed in one of the plurality of sides for releasing loose materials when the containment base is tipped. Finally, the dump body includes at least one side door pivotably attached to the containment base and covering a first opening formed in at least a portion of one of the plurality of sides. The side door permits packaged loads to be loaded onto the dump truck, wherein the sides on the dump truck normally prohibit the carrying of this type of load.

19 Claims, 6 Drawing Sheets

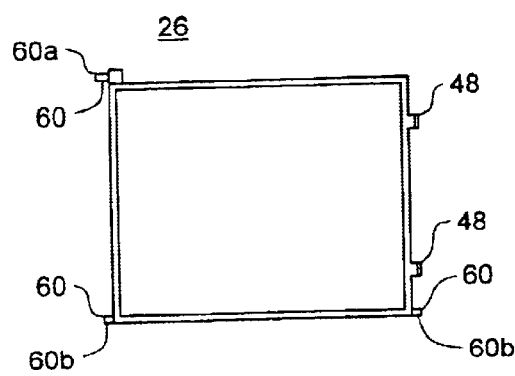
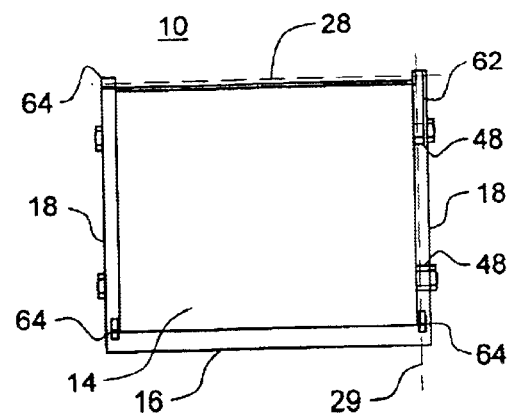
FIG. 11        FIG. 12
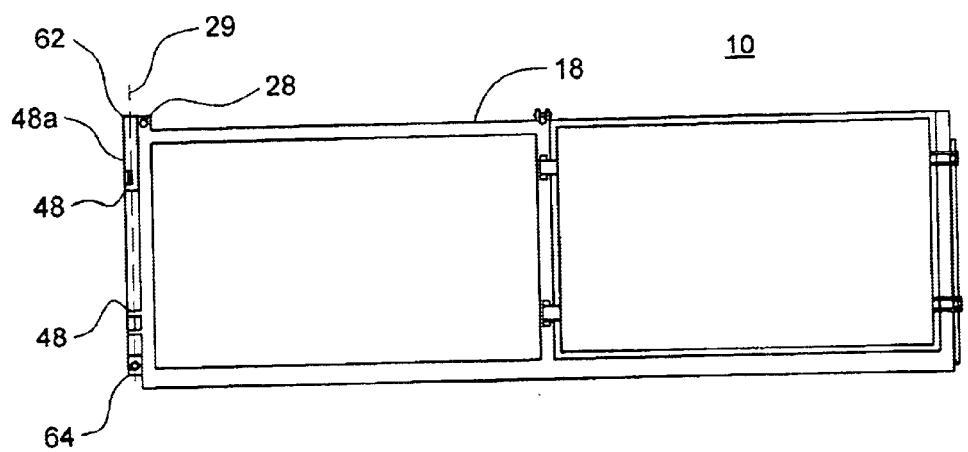
FIG. 13

COMPARTMENTALIZED DUMP BODY FOR A DUMP TRUCK

FIELD OF THE INVENTION

The present invention is in the field of heavy-duty, load-bearing vehicles. Specifically, the present invention is in the field of dump trucks. More specifically, the present invention is a novel dump body for a dump truck.

BACKGROUND OF THE INVENTION

Presently, many types of vehicles are used for carrying various bulky, cumbersome loads. Flat bed trucks and trucking rigs with semitrailers are used for carrying pallets of heavy items, such as lumber ("packaged loads"). Looser bulk loads, such as dirt, mulch, or fertilizer ("loose loads")—in large quantities—are carried by dump trucks. The benefit of the dump truck is a loose load requires a tipping, load-bearing body to remove the loads efficiently. Businesses that need to transport an array of these loads needs to own a multitude of vehicles as required for the loads. Ideally, a single vehicle would be capable of transporting packaged loads, such as lumber pallets, as well as loose loads.

A similar problem is encountered attempting to transport loose loads and packaged loads from one location to another. Often neither the loose load nor the packaged load is large enough so that weight or volume dictates the need for multiple vehicles. However, no one vehicle presently exists that can transport both the packaged load and loose load. Flat bed trucks would have difficulty efficiently carrying loose loads and depositing the loads at the destination while the sides of the dump body on a dump truck makes loading and unloading pallets in the dump body impossible. As a result, multiple vehicles are used to transport the loads when the volume and weight of the combined loads only merits a single vehicle. Therefore, a vehicle is needed that can simultaneously carry packaged loads and loose loads.

Similarly, there are occasions when two separate loose loads need to be transported to a single location. Again multiple vehicles, or a singular vehicle making multiple trips is required to transport the loads when the volume and weight of the combined loads only merits a single vehicle. Therefore, a vehicle is needed that can simultaneously carry multiple, individual loose loads separately.

Previous vehicles have been devised to multiple loose loads in a dump body of a dump truck. Those vehicles contained partition doors in the middle of the vehicle, which separated the multiple loads and were manually opened from inside the dump body. Each of the partition doors extended across have of the dump body, meeting in the center of the dump body where they were latched. Dump bodies are not constructed for convenient access for individuals. Ideally, a dump body could be designed with a latched partition operable from outside the dump body.

SUMMARY OF THE INVENTION

The present invention is based on the realization that a heavy-duty transportation vehicle can be constructed to carry both packaged and loose loads by installing a side door on a dump body for a dump truck. The side door would permit the loading and unloading of pallets or other packaged loads with a forklift onto the dump body, while the dump body would remain tippable for unloading loose loads.

One embodiment of the present invention would also include at least one partition within the dump body for compartmentalizing the body and separating the loads. Under this embodiment, the dump body could be partitioned to create a front and back compartment. The front compartment would utilize a side door and carry packaged loads. The back compartment would carry loose loads, which are released through a backdoor to the dump body when the dump body is tipped.

Therefore, it is an object of one embodiment of the present invention to design a single vehicle capable of transporting either a large, packaged load or a large, loose load with a single vehicle.

It is further object of one embodiment of the present invention to enable the separated transportation of a large, packaged load and a large, loose load on a single vehicle.

It is a further object of one embodiment of the present invention to enable the separated transportation of two large, loose loads on a single vehicle.

BRIEF DESCRIPTION OF THE DRAWINGS

These and other features and advantages of the present invention will be better understood by reading the following detailed description, taken together with the drawings wherein:

FIG. 6b shows a cross-sectional view of the embodiment of the partition latch for the present invention shown in FIG. 6a.

FIG. 11 shows a side view of one embodiment of the dumping door for the present invention.

FIG. 12 shows a cross-sectional view of one embodiment of the rear of the dumping body as designed to receive the dumping door of FIG. 11.

FIG. 13 shows a side view of the embodiment of the dumping body for the present invention shown in FIG. 12.

DETAILED DESCRIPTION OF THE INVENTION

Figure 1:
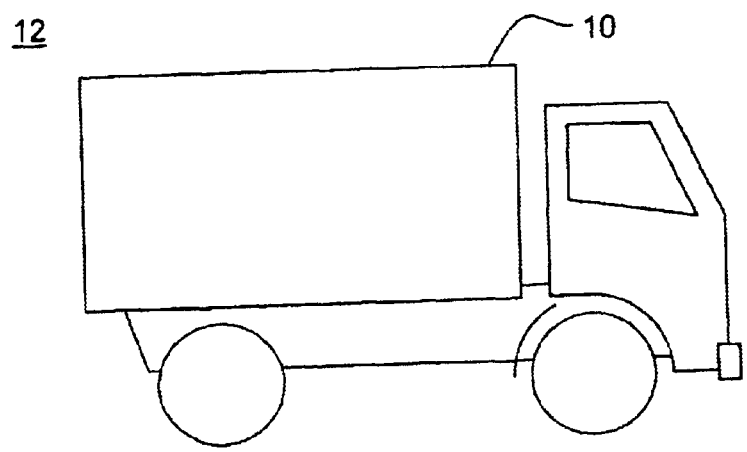
FIG. 1 shows a side view of a dump truck in the prior art.
Figure 2:
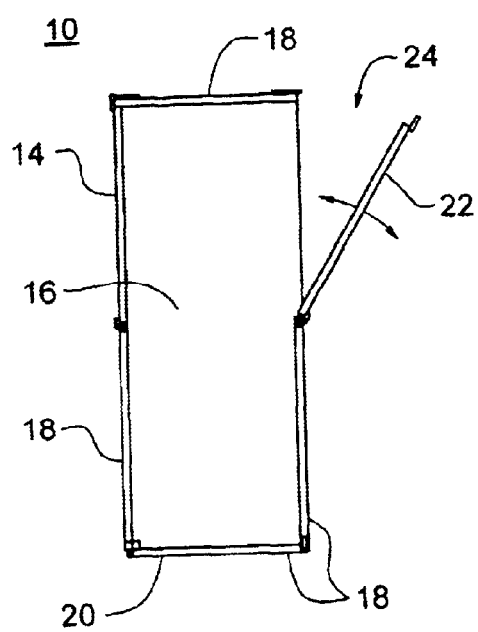
FIG. 2 shows an overhead view of one embodiment of the present invention, a dump body.
Figure 3:
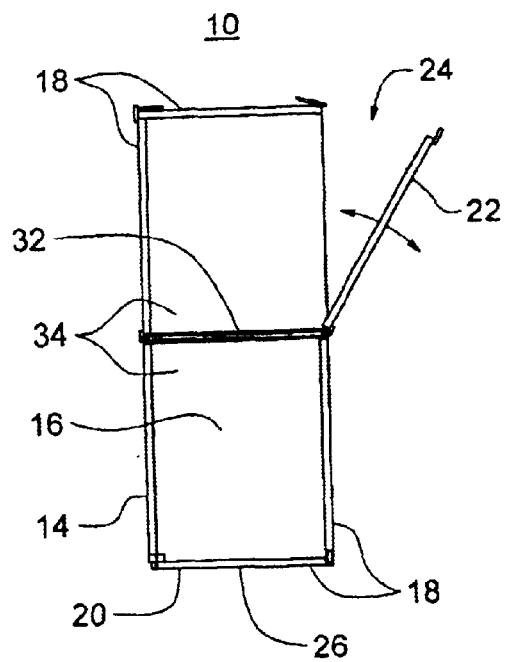
FIG. 3 shows an overhead view of another embodiment of the present invention.
Figure 4:
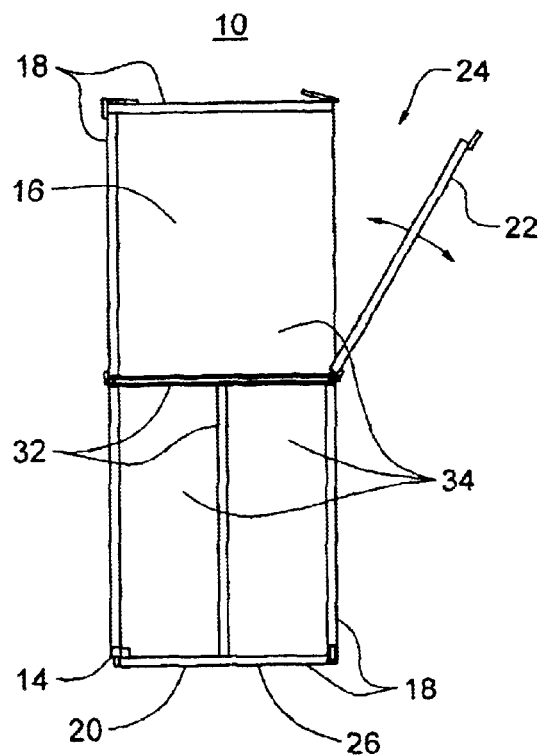
FIG. 4 shows an overhead view of another embodiment of the present invention.
Figure 5:
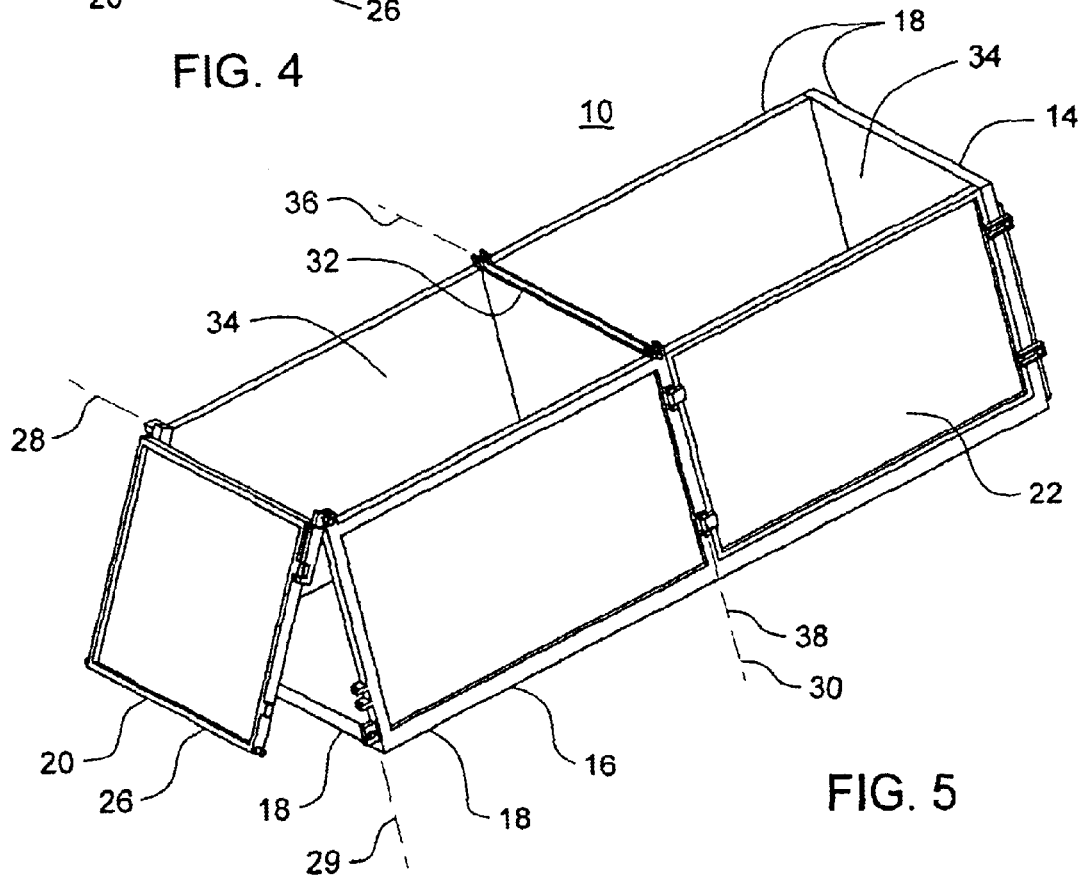
FIG. 5 shows a three-dimensional view of one embodiment of the present invention.

The present invention is a novel dump body 10 for a dump truck 12, which enables the dump truck 12 to carry large, packaged loads and large, loose loads. The dump body 10 includes a containment base 14 having a bottom 16 and a plurality of sides 18. The dump body 10 further includes a dumping means 20 formed in one of the plurality of sides 18 for releasing loose materials when the containment base 14 is tipped. Finally, the dump body 10 includes at least one side door 22 pivotably attached to the containment base 14 and covering a first opening 24 formed in at least a portion of one of the plurality of sides 18.

The side door permits packaged loads to be loaded onto the dump truck. Packaged loads are normally loaded onto a truck with a forklift. The sides on the dump truck normally prohibit the loading and unloading of a packaged load. The basic design of the present invention allows a single vehicle to be used for transporting packaged loads or loose loads, wherein loose loads are those that can be loaded over the side of the dump body and require the dump truck to tip the dump body to remove the load. Narrower embodiments of the present invention identify further novelties.

In one narrower embodiment the dumping means 20 is a dumping door 26 pivotably attached to the containment base 14. In a further narrow embodiment, the dumping door 26 pivots on an axis 28 that is substantially parallel to the bottom 16 of the base 14. In another further narrowing embodiment, the dumping door 26 is built to pivot on the axis 28 substantially parallel to the bottom 16 of the base 14 and on an axis 29 substantially perpendicular to the bottom 16 of the base 14.

In another narrow embodiment, at least one of the side doors 22 pivots on an axis 30 that is substantially perpendicular to the bottom 16 of the base 14.

In another narrow embodiment, the dump body further includes at least one partition 32 separating the base 14 into a plurality of compartments 34. The partition permits the simultaneous transport of packaged loads and loose loads without automatically co-mingling the loads. This embodiment is further narrowed wherein every compartment 34 is accessible by either one of the side doors 22 or the dumping means 20. In another embodiment, the partition 32 is pivotably attached to the base 14 thereby permitting co-mingling of a plurality of the compartments 34 when dumping. This embodiment is further narrowed wherein at least one of the partitions 32 pivots on an axis 36 substantially parallel to the bottom 16 of the base 14. Similarly, this embodiment is further narrowed wherein at least one of the partitions 32 pivots on an axis 38 substantially perpendicular to the bottom 16 of the base 14. Finally, this embodiment is further narrowed wherein at least one of the partitions 32 has a latch 40, thereby enabling prevention of use of the pivoting feature. This feature of the invention would allow different loose loads to be carried by a single dump truck 12. By latching the partitions 32, one load could be dumped while the other remains in the dump body 10. Then, unlatching one partition 32 will allow another load to be dumped, and so on until all of the loose loads in the truck 12 are removed.

Figure 6A:
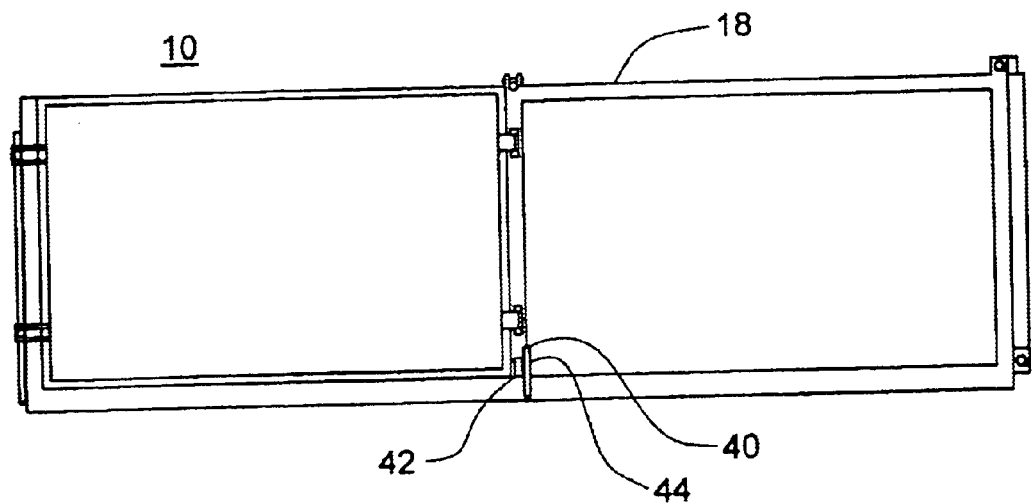
FIG. 6a shows a side view of one embodiment of the partition latch for the present invention.
Figure 6B:
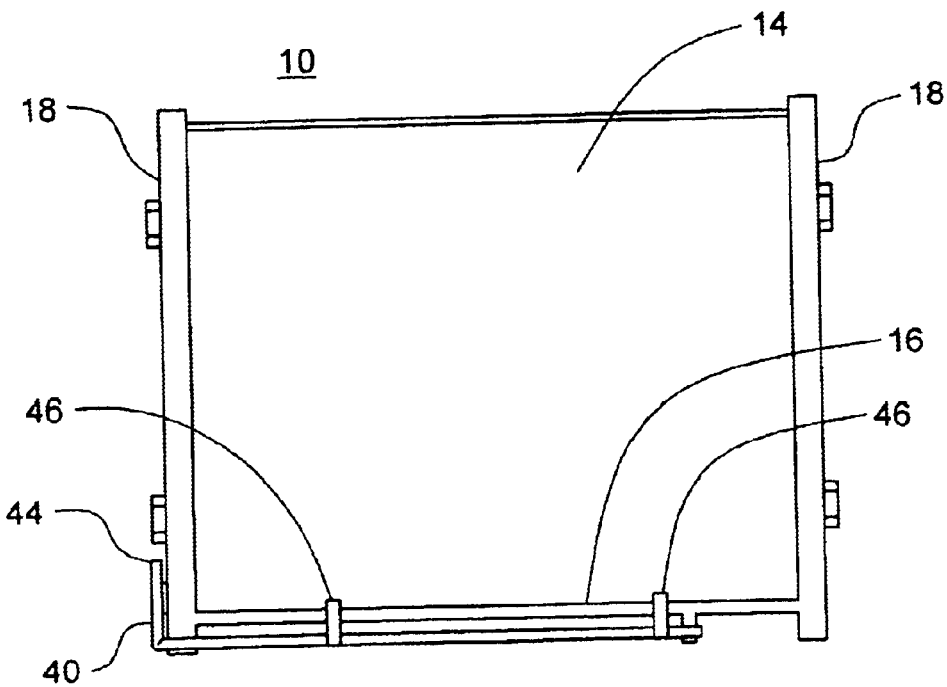

FIG. 6A shows a side view of one embodiment of the partition 32 latch 40. FIG. 6B shows a cross-sectional view of the same embodiment. The latch 40 includes a stop 42, a handle 44, and one or more pins 46. The latch 40 is arranged such that pulling the handle 44 away from the stop 42 recedes the pins 46 into the bottom 16 of the containment base 14. The pins 46 can be designed to either penetrate the partition 32 or rest against the petition 32 when raised, impeding the pivot action of the partition 32. This latch 40 design is one of many that may be employed by those skilled in the art.

Figure 7:
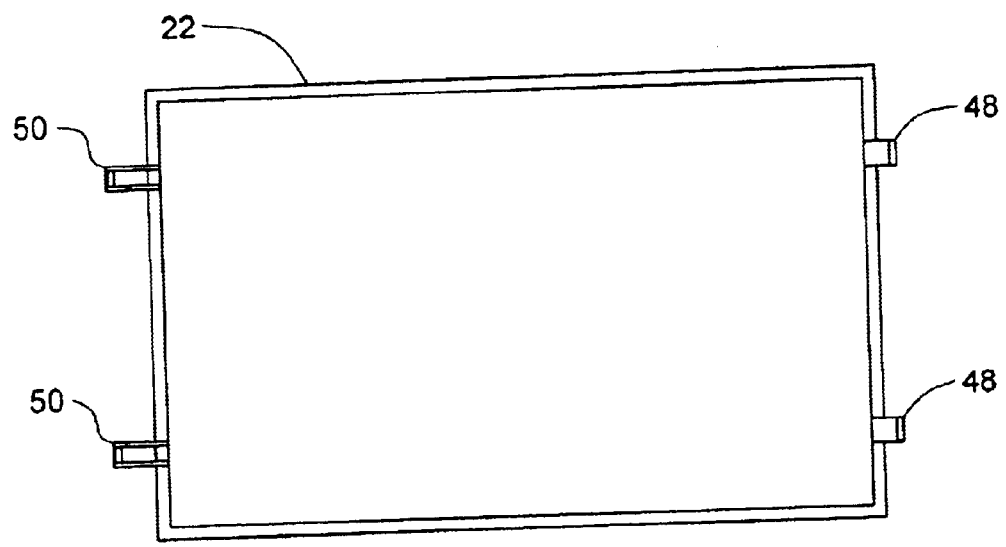
FIG. 7 shows a side view of one embodiment of the side door for the present invention.
Figure 8:
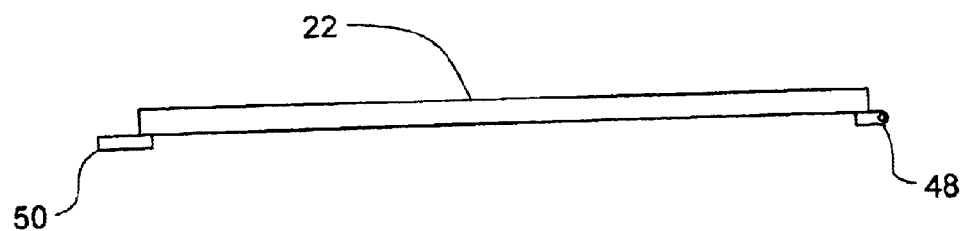
FIG. 8 shows an overhead view of the embodiment of the side door for the present invention shown in FIG. 7.
Figure 9:
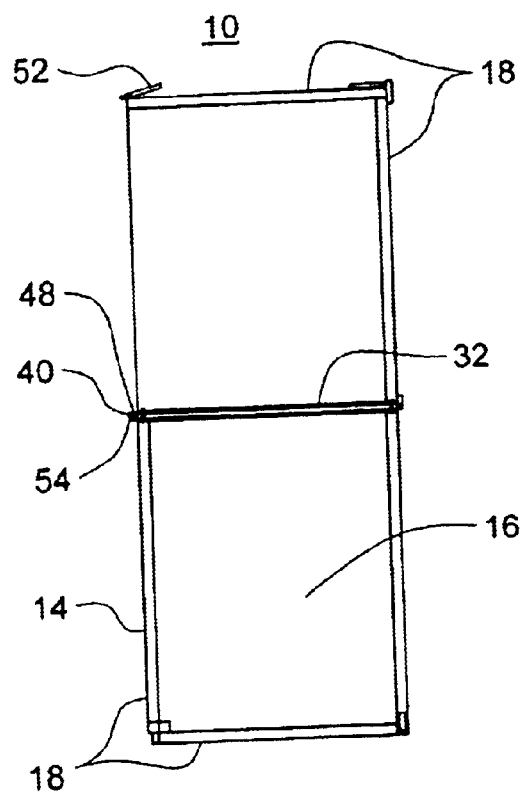
FIG. 9 shows an overhead view of the dump body for the present invention as designed to receive the side door of FIGS. 7 and 8.
Figure 10:
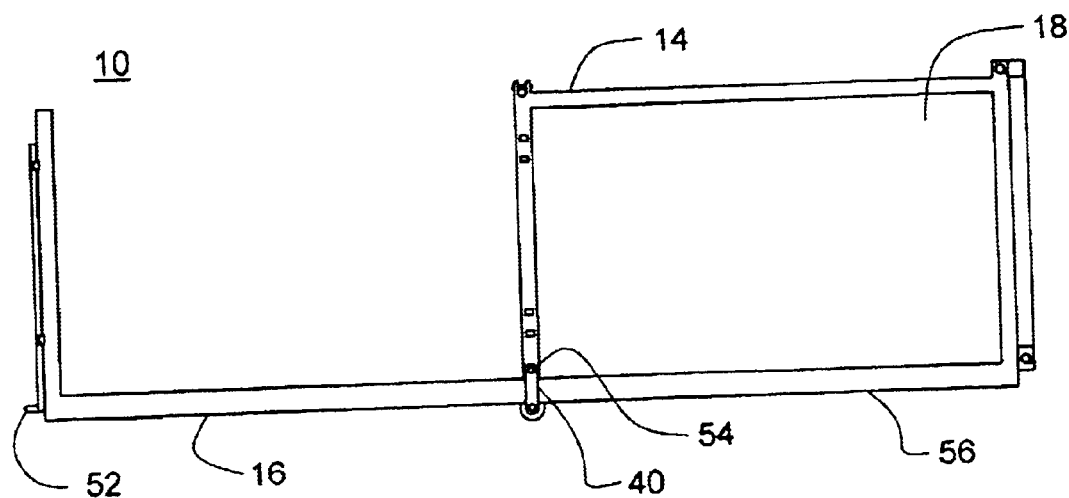
FIG. 10 shows a side view of the embodiment of the dump body for the present invention shown in FIG. 9.

FIGS. 7, 8, 9, and 10 show one embodiment of the side door 22. FIGS. 7 and 8 show only the side door 22 while FIGS. 9 and 10 show the dump body absent the side door 22.

The side door 22 includes hinges 48, which connect the side door 22 pivotably to the one of the sides 18 of the containment base 14. The side door 22 further includes one or more pins 50, which extend from an end of the side door opposite the hinges 48. When the side door 22 is closed, the pins 50 secure to the latch bar 52, which is a vertical bar, exterior to the containment base 14. Locating the pins 50 and latch bar 52 exterior to the containment base 14 works to avoid damaging the latching mechanism either with the force of a large load or the contamination from loose load debris and also avoids the possibility of a load obstructing the latching mechanism.

FIGS. 9 and 10 also show another embodiment for the partition 32 latch 40. In these figures, the partition 32 latch 40 is a pin 54 that presses into the partition 32 and is reinforced with compressed air. A similar mechanism could be designed that would work on other hydraulic principles.

FIG. 10 also shows a longitudinal member 56 at the bottom 16 of the dump body 10. Dump bodies are designed to hold significant weight. Traditional dump bodies have a continuous side wall, firmly connected to the containment base bottom, which supports some of the vertical forces applied to the containment base bottom. The present dump body 10 is designed with an opening 24 in the containment base 14 side 18, as opposed to a continuous side wall, which at least partially inhibits the side 18 from supporting vertical forces applied to the containment base 14 bottom 16. As a result, one embodiment of the present invention includes a high-grade steel longitudinal member 56 running the length of the containment base 14 and located beneath the opening 24. The high-grade steel longitudinal member 56 is of a higher strength than a longitudinal employed on a traditional dump body.

FIGS. 11, 12, and 13 are depictions of the dumping door 26, dumping door opening 58 in the dump body 10, and a side 18 of the dump body 10, all showing one embodiment of the dumping door 26. The dumping door 26 includes hinges 48 on one side of the door 26 and pegs 60 on three corners of the door 26. The pegs 60 interlock with receivers 64 on the dump body 10. In this embodiment, the dumping door 26 is capable of pivoting on an axis 28 that is substantially parallel to the bottom 16 of the base 14 and on an axis 29 substantially perpendicular to the bottom 16 of the base 14. When pivoting on the vertical axis 29, all three pegs 60 are released from their respective receivers 64 and both hinges 48 have pins inserted. When pivoting on the horizontal axis 28, the top peg 60a, is held by its receiver 64, while the remaining two pegs 60b are released, and the pin from the bottom hinge 48 is removed to allow the hinge 48 portion connected to the door 26 to separate from its respective hinge 48 portion connected to the dump body 10. Further enabling the door 26 to pivot on two axes is the pivoting hinge 48a, which is pivotably connected to the side 18 of the containment base 14 on one axis 28 while forming one of the hinges 48 for the dumping door 26 on another axis 29.

Modifications and substitutions by one of ordinary skill in the art are considered to be within the scope of the present invention, which is not to be limited except by the following claims.

We claim:

1. A dump body for a dump truck, said dump body comprising:

a containment base having a bottom and a plurality of sides;

a dumping means formed in one of the plurality of sides for releasing loose materials when the containment base is tipped;

at least one side door pivotably attached to the containment base and covering a first opening formed in at least a portion of one of the plurality of sides; and at least two partitions separating the base into three compartments, wherein a first and second compartment are accessible through the dumping means and a third compartment is accessible through the side door.

2. The dump body of claim 1 wherein the dumping means is a dumping door pivotably attached to the containment base.

3. The dump body of claim 2 wherein the dumping door pivots on an axis that is substantially parallel to the bottom of the base.

4. The dump body of claim 2 wherein the dumping door is configured to be pivotable both on an axis substantially parallel to the bottom of the base and on an axis substantially perpendicular to the bottom of the base.

5. The dump body of claim 1 wherein the at least one side door pivots on an axis that is substantially perpendicular to the bottom of the base.

6. The dump body of claim 1 wherein each of the compartments is accessible by at least one of the group comprised of: the at least one side door; and the dumping means.

7. The dump body of claim 1 wherein at least one of the partitions is pivotably attached to the base thereby permitting co-mingling of a plurality of the compartments.

8. The dump body of claim 7 wherein at least one of the partitions pivots on an axis substantially parallel to the bottom of the base.

9. The dump body of claim 7 wherein at least one of the partitions pivots on an axis substantially perpendicular to the bottom of the base.

10. The dump body of claim 7 wherein at least one of the partitions is latchable thereby enabling prevention of use of the pivoting.

11. The dump body of claim 10 wherein at least one of the partitions is latched by at least one raisable pin, said pin recessed within the bottom of the compartment body, whereby the pin restricts pivotable motion of the partition.

12. The dump body of claim 1 further comprising a high-grade longitudinal member connected across the bottom of the containment base beneath the first opening.

13. The dumping body of claim 1 further comprising a side door latching mechanism for securing the at least one side door in a closed position, wherein the latching mechanism is exterior to the containment body.

14. A dump body for a dump truck, said dump body comprising:

a containment base having a bottom and a plurality of sides;

a dumping means formed in one of the plurality of sides for releasing loose materials when the containment base is tipped; and at least one partition door separating the base into at least two compartments, wherein the partition door is pivotably attached to the base on an axis substantially perpendicular to the bottom of the base, thereby permitting co-mingling of the compartments.

15. The dump body of claim 14 wherein each of said compartments is accessible by the dumping means.

16. The dump body of claim 14 wherein the at least one partition door is latchable thereby enabling prevention of use of the pivoting.

17. A dump body for use with a dump truck, said dump truck body comprising:

a containment base having a bottom and a plurality of sides;

a dumping door attached to said containment base for releasing materials when the containment base is tipped;

at least one side door attached to and covering an opening formed in one of said sides of said containment base wherein said side door pivots on an axis substantially perpendicular to the bottom of the base;

at least one partition separating the containment base into at least first and second compartments, said partition pivots on an axis substantially parallel to the bottom of the base, wherein the dumping door allows access to only the first compartment, and wherein the side door allows access to only the second compartment.

18. The dump body of claim 17 wherein said at least one side door includes first and second side doors, and wherein said at least one partition includes first and second partitions separating the containment base into first, second and third compartments, wherein the dumping door allows access to only the first compartment, wherein the first side door allows access to only the second compartment, and wherein the second side door allows access to only third compartment.

19. The dump body of claim 17 wherein said dumping door pivots on an axis that is substantially parallel to the bottom of the base.

* * * * *